United States Patent
Vanotti

[11] 3,873,257
[45] Mar. 25, 1975

[54] AUTOMATIC MOULD FOR THE CONTINUOUS MOULDING OF CHAINS MADE OF DUCTILE MATERIALS

[75] Inventor: Guy Vanotti, Oyonnax, France

[73] Assignee: Etablissements Vape, Oyonnax, France

[22] Filed: Dec. 6, 1972

[21] Appl. No.: 312,617

[30] Foreign Application Priority Data
Mar. 30, 1972 France .............................. 72.11993

[52] U.S. Cl.................. 425/112, 425/122, 425/129, 425/246, 425/450 R, 425/451
[51] Int. Cl. ....................... B29c 1/16, B29d 31/00
[58] Field of Search .......... 425/246, 112, 224, 247, 425/122, 129, 126, DIG. 34, 450 R, 451; 249/57; 59/35; 164/279, 276, 275

[56] References Cited
UNITED STATES PATENTS

| | | | |
|---|---|---|---|
| 3,070,843 | 1/1963 | Jurgeleit .......................... | 425/246 X |
| 3,284,853 | 11/1966 | Moneymaker ................... | 425/246 X |
| 3,333,299 | 8/1967 | Florjancic .......................... | 249/57 X |
| 3,469,284 | 9/1969 | Ross .................................. | 249/57 X |
| 3,588,959 | 6/1971 | Russo ................................ | 249/57 X |
| 3,671,159 | 6/1972 | Greenberg ...................... | 425/248 X |

Primary Examiner—Francis S. Husar
Assistant Examiner—David B. Smith
Attorney, Agent, or Firm—Raymond A. Robic; Arthur Schwartz; Eugene Mar

[57] ABSTRACT

Automatic mould for continuously moulding a chain of a ductile material, especially of plastic material or of alloy of light metals, according to a continuous cycle of successive injections, each one of said successive injections producing a series of links connected to each other, a first link of a series being connected to a last link of a preceding series. The mould comprises a rotatable hub, molding elements arranged around the hub and an injection plate which locks the moulding elements when they are rotatably driven in front of the injection plate. The rotation of the hub provides, during a half-turn, the cooling of the injected material in the moulding elements. Means are also provided for dismantling the moulding elements for the withdrawal of a moulded article at the opposite part of the injection plate.

6 Claims, 5 Drawing Figures

AUTOMATIC MOULD FOR THE CONTINUOUS MOULDING OF CHAINS MADE OF DUCTILE MATERIALS

The present invention relates to an automatic mould which permits the moulding of a continuous chain of ductile material, especially of plastic material or of alloy of light metals.

Working equipment in various forms are already known for manufacturing chains of plastic material.

Some equipment require the resumption of the chain because by each injection only some links are formed in the mould, so that the continuity is only obtained by successive phases, each of them involving many operations such as: opening of the mould, release of the chain, replacing of the same, cooling of the mould, and so on.

Some others, which are truly working continuously and make use of rollers laminating a string issuing from an extruding machine, do not ensure the maintenance of the chain for the cooling of the plastic material so that the links buckle as soon as they are formed. Moreover, for producing this type of chain, it is necessary to do some trimming which considerably increases the operational cost.

The object of the present invention is to remedy these disadvantages by the use of an automatic mould for the continuous moulding of a chain of ductile material in one or more colors and without handling of the chain at each injection operation.

According to the invention the successive operations relating to the moulding are carried out in accordance with a continuous rotative cycle during which takes place: the injection producing several connected links, the first of then being connected with the last link of a preceding injection, the cooling during half a turn and finally the withdrawing of the achieved chain, from it suffices to cut the tail.

The mould concerned is characterized by the fact that it comprises several moulding elements grouped around a hub having a rotative movement which permits the successive driving of the moulding elements in front of an injection plate which locks them, and afterwards providing the cooling of the injected material and its withdrawing from the mould on the side opposite the injections side by dismantling the component parts of each element.

According to a preferred form of the invention, the mould comprises eight moulding elements, each element comprising four parts jointed by their middle lines, in front of which are grooved the imprints of several imbricated links and of two half-links of extremities which are connected with the half-links of a preceding and following elements surrounding said element; these elements are fixed by means of soles, provided in the two lower component parts of the moulding elements, inside transversal grooves made on the faces of an octangular hub, the rotation shaft of which borne by two bearings fixed to the frame, is driven mechanically.

The periodical rotation of the hub brings successively each moulding element in front of injection inlets of the pressplate which comprises two side stops designed to reunite the component parts of said moulding element previously dismantled.

These two stops slide against oblique rails or facings of the injection plate which tend to bring the stops nearer against the parts of each moulding element in order to lock them.

The dismantling of the four component parts composing each moulding element takes place half a turn after the injection, by means of two pairs of crossed radial spindles fixed by their extremities to the two upper component parts of each moulding element and traversing the two lower component parts, in such a way that under the action of two lateral cams fixed to the bearings of the hub rotation shaft, the thrust of the spindles provides the separation of the component parts of a moulding element according to a lateral opposite sliding movement of the lower parts directly fixed to the hub and an oblique outward and opposite movement of the two upper parts.

The enclosed drawings illustrate, as an example, an embodiment of the mould according to the present invention.

Figure 1:
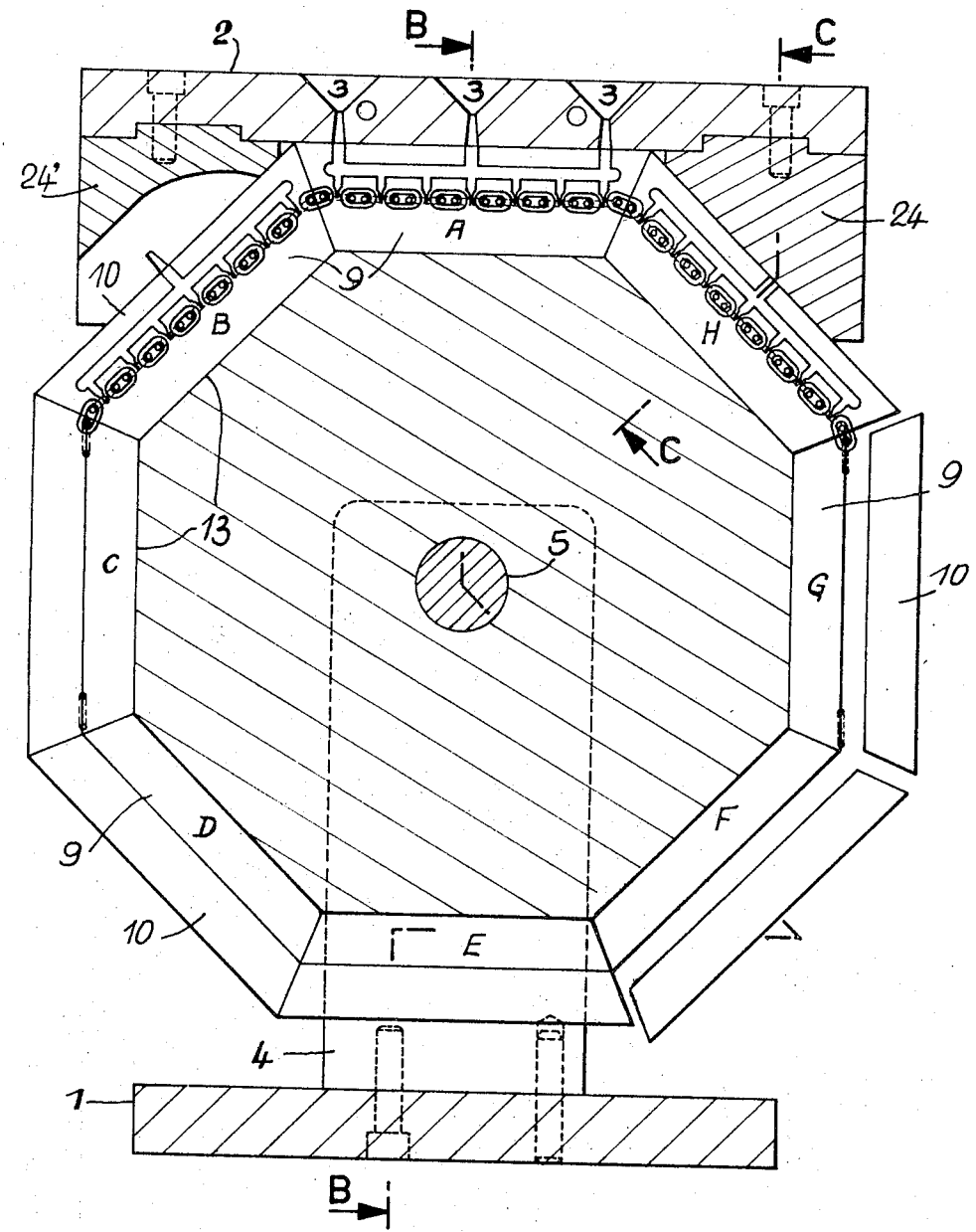
FIG. 1 is a cross-sectional front view of the mould in which two of the component parts of a moulding element in a moulding position and of two adjacent moulding elements are removed to show the imprints which are grooved in them. The section is taken along line E—E of FIG. 2.

On the drawings, numeral 1 designates the frame, numeral 2 shows the moveable plate of the mould with material injection inlets referred to as 3, one of these inlets communicating with the mould whereas the others are plugged. This device allows the successive injection of material in three colors.

The frame 1 is equipped with two side or lateral bearings 4 supporting the ends of a shaft 5 of an octagonal hub 6 integrally connected to the shaft by keying. For instance, it is by the end 7 that the shaft 5 is driven mechanically in rotation, whereas its other end is provided with an eccentric 8 for any other purpose.

Around the hub 6 and against its eight faces 13 are fixed the moulding elements which are driven in rotation with said hub. Each element comprises four component parts, the lower or inner parts 9 and the upper or outer parts 10 said parts being jointed by their middle lines as shown on FIGS. 1 and 2. It is on the faces M of said parts that are grooved the mutually perpendicular half-imprints of half-links of a chain in such a way that when parts 9 and 10 of the moulding elements are assembled (FIGS. 1 and 2) the imprints complete each other at the level of the middle lines to form connected or fit links. Each extremity of the element terminates with an imprint of a half-link which is connected to the imprint of a half-link of a preceding element, as it may be seen in FIG. 1.

The two lower component parts 9 of each moulding element are provided with soles 12 engaged in transversal grooves 14 made on the faces 13 of the hub 6. Each of the two upper parts 10 of an element is fixed to one end of a pair of radial spindles 15, the other end of the spindles being equiped with rollers 16.

The flanges of hub 6 are recessed in order to give way to cams 17 and 18, fixed respectively to one of the bearings 4 supporting the shaft 5 of said hub.

Cams 17 and 18 are adapted to thrust the pairs of spindles 15 to which are fixed the upper parts 10 of the moulding elements. Thus the pairs of spindles are arranged in such a manner (FIG. 2) that the pair of spindles 15 controlling the right upper part 10 of the element is driven by the left cam 17, whilst on the contrary the pair of spindles 15' associated with the left upper part 10 of the element is controlled by the right cam 18, in such a way that the pairs of spindles 15 and 15' cross each other and for doing so the spindles pass through the corresponding lower part 9 of the moulding element. The free ends of the pair of spindles 15 take support against their respective cam through the roller 16 which they carry. As to the four lower parts 9 and the upper parts 10 of the elements, they are guidably connected to each other by pins 19.

The injection plate 2 of the press is provided with two stationery stops 20, each forming an oblique railing 21 for cooperating with the outer face 22, of the same direction of two moveable lateral drivers 23, guided and connected to plate 2 by pegs 25. Two other stationary drivers 24 ensure the maintenance of a following H and of a preceding E moulding elements adjacent to the element A in which the injection takes place. The driver 24' blocking the element B in which the preceding injection has just taken place, is recessed to permit the passage of the injection tails (FIG. 1).

In position A, the element received the injection from one of the inlets 3 of the plate 2. The drivers 23 and 24 blocked by the stationary stops 20 of plate 2 lock the four component parts 9 and 10 of the element.

In positions B – C – D and E the component parts of the element remain assembled. It is during this half-turn that the cooling of the chain takes place.

Figure 3:
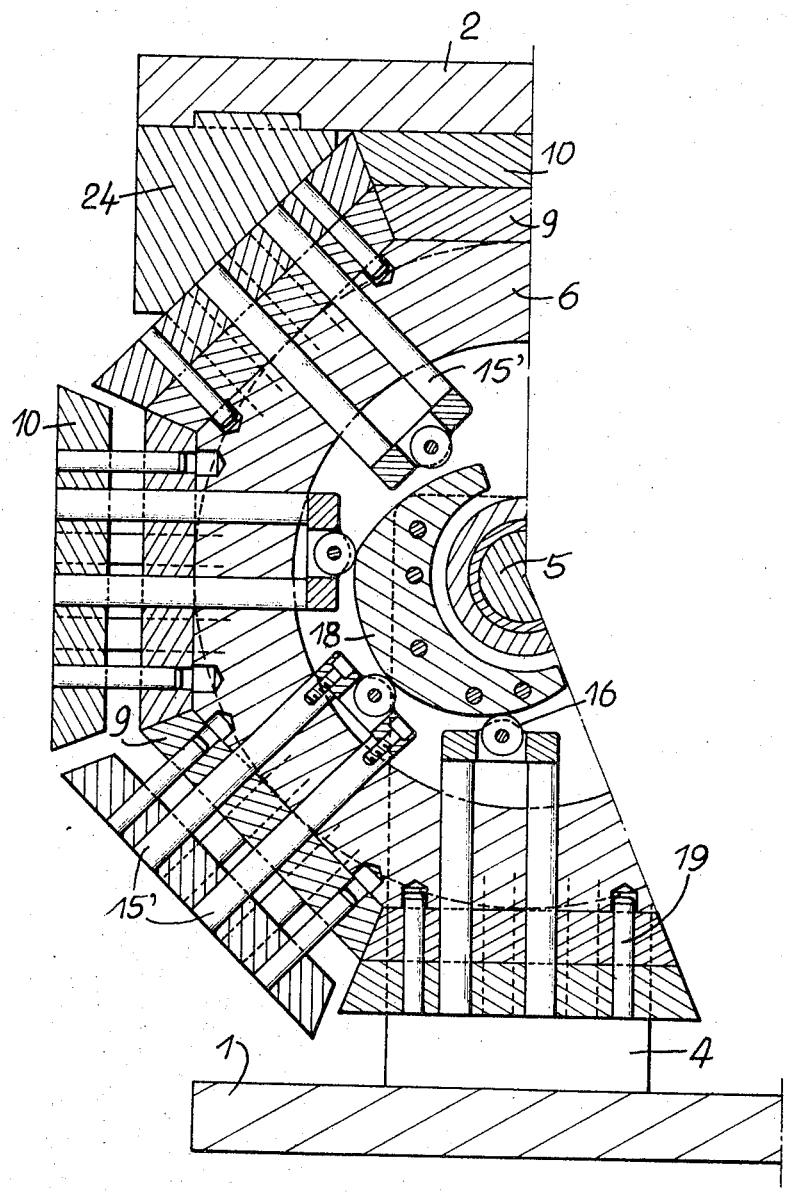
FIG. 3 is a cross-sectional view in partial elevation along line D—D of FIG. 2.

The withdrawing from the mould is operated in position F. Under the action of cams 17 and 18, the pairs of spindles 15 and 15' dismantle the four parts 9 and 10 of the element, the lower parts 9 sliding laterally and the upper parts 10 having an oblique opposite movement (FIG. 3).

In position G, the component parts of the element remain separated.

Figure 2:
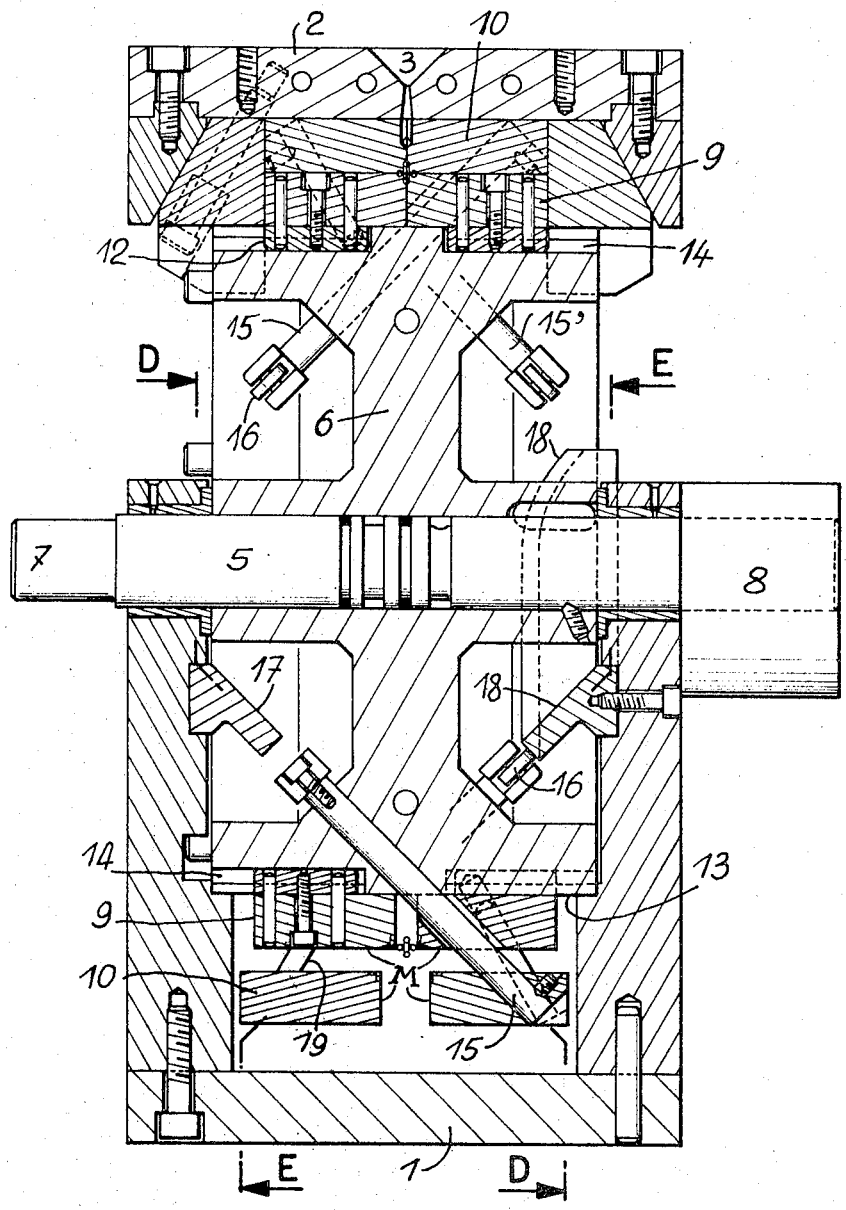
FIG. 2 is a cross-sectional side view along line B—B of FIG. 1.
Figure 4:
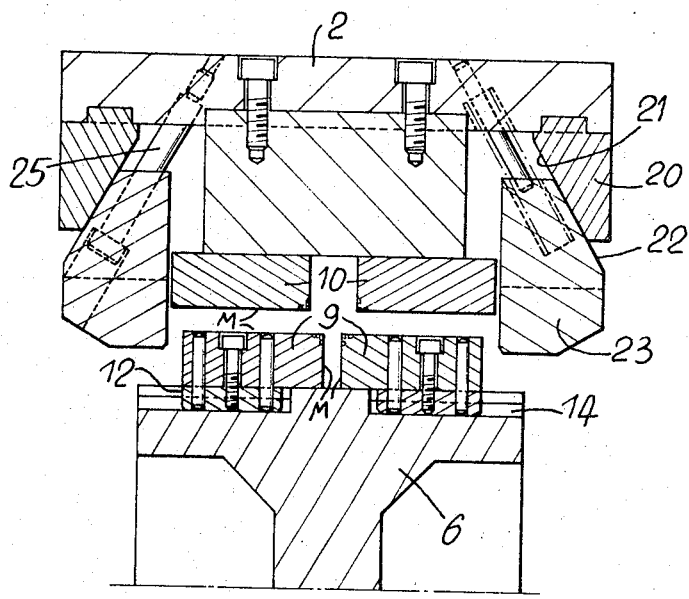
FIG. 4 is a partial view of side elevation of the mould along line C—C of FIG. 1. On this Figure the press plate has not locked the component parts of the moulding element.
Figure 5:
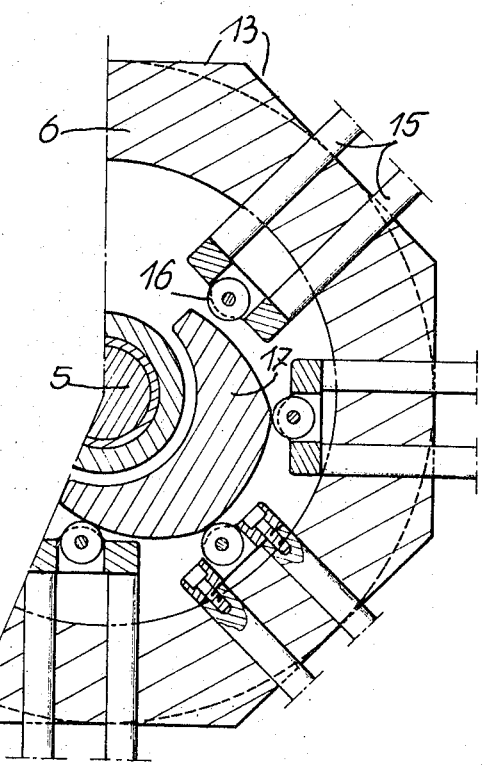
FIG. 5 is a detail view of pairs of spindles and their cams providing the dismantling of the component parts of the moulding element. This section view is taken along line E—E of FIG. 2.

In position H and A, the component parts of the element are reunited by means of the movable drivers 23 pushed by the stops 20 during the lowering of the plate 2 (FIGS. 2 and 4).

At each phase A the last half free link of the injection is connected to the half-link of extremity of a preceding element H.

I claim:

1. An automatic moulding apparatus for the continuous moulding of a chain made of ductile materials and having a series of links connected together wherein the apparatus comprises in combination;
  a. a frame,
  b. a hub rotatably supported on the frame,
  c. a plurality of individual mould assemblies secured around the periphery of the hub for moulding successive sections of the series of links wherein each first link of a section is freely and loosely connected to the last link of a preceding section with each mould assembly comprising relatively movable mould parts,
  d. an injection moulding plate movable towards and away from each mould assembly, successively, during the rotation of the hub,
  e. means carried by the injection moulding plate for successively locking together the parts of each mould assembly upon movement towards the same, and
  f. means secured to the hub for successively releasing the mould parts to thereby release each section of moulded links during rotation of the hub.

2. The moulding apparatus of claim 1 wherein the injection moulding plate includes a plurality of injection inlets.

3. An automatic moulding apparatus for the continuous moulding of a chain made of ductile material and having a series of links connected together wherein the apparatus comprises, in combination;
  a. a frame,
  b. a hub rotatably supported on the frame,
  c. a plurality of individual mould assemblies secured around the periphery of the hub for moulding successive sections of the series of links wherein each first link of a section is connected to the last link of a preceding section with each mould assembly comprising relatively movable mould parts which include:
    1. two upper mould parts,
    2. two lower mould parts,
    3. a pair of radial spindles passing through the two lower mould parts with one pair of the spindle ends being connected to the two upper mould parts and the other pair of spindle ends being provided with rollers,
  d. an injection moulding plate movable towards and away from each mould assembly, successively, during the rotation of the hub,
  e. means carried by the injection moulding plate for successively locking together the parts of each mould assembly upon movement towards the same, and
  f. means secured to the hub for successively releasing the mould parts to thereby release each section of moulded links during rotation of the hub.

4. The moulding apparatus of claim 3 wherein the means for successively releasing the mould parts includes cam means secured to the hub for engagement with the rollers on the ends of each pair of spindles.

5. The moulding apparatus of claim 3 wherein the hub further includes a plurality of transverse grooves for receiving the two lower mould parts of each mould assembly for sliding movement therein.

6. An automatic moulding apparatus for the continuous moulding of a chain made of ductile material and having a series of links connected together wherein the apparatus comprises, in combination;
  a. a frame,
  b. a hub rotatably supported on the frame,
  c. a plurality of individual mould assemblies secured around the periphery of the hub for moulding successive sections of the series of links wherein each first link of a section is freely and loosely connected to the last link of a preceding section with each mould assembly including:

d. an injection moulding plate movable towards and away from each mould assembly, successively, during the rotation of the hub,
e. means carried by the injection moulding plate for successively locking together the parts of each mould assembly upon movement towards the same, which means includes:
  1. a plurality of stop members having oblique facings thereon,
  2. a plurality of pegs,
  3. a plurality of movable drivers guidably connected to the pegs, wherein the drivers include corresponding oblique facings for sliding movement against the oblique facings of the stop members, and
f. means secured to the hub for successively releasing the mould parts to thereby release each section of moulded links during rotation of the hub.

* * * * *